United States Patent
Cebere

(10) Patent No.: US 10,644,949 B2
(45) Date of Patent: May 5, 2020

(54) SYSTEMS AND METHODS FOR AUTOMATIC DEVICE DETECTION

(71) Applicant: Bitdefender IPR Management Ltd., Nicosia (CY)

(72) Inventor: Bogdan C. Cebere, Bucharest (RO)

(73) Assignee: Bitdefender IPR Management Ltd., Nicosia (CY)

(*) Notice: Subject to any disclaimer, the term of this patent is extended or adjusted under 35 U.S.C. 154(b) by 84 days.

(21) Appl. No.: 15/472,515

(22) Filed: Mar. 29, 2017

(65) Prior Publication Data

US 2017/0288965 A1    Oct. 5, 2017

Related U.S. Application Data

(60) Provisional application No. 62/315,834, filed on Mar. 31, 2016.

(51) Int. Cl.
*H04L 12/24* (2006.01)
*H04L 12/46* (2006.01)
(Continued)

(52) U.S. Cl.
CPC ...... *H04L 41/0876* (2013.01); *H04L 12/2807* (2013.01); *H04L 12/4625* (2013.01);
(Continued)

(58) Field of Classification Search
None
See application file for complete search history.

(56) References Cited

U.S. PATENT DOCUMENTS

| 6,741,853 | B1 | 5/2004 | Jiang et al. |
| 7,729,294 | B2 | 6/2010 | Yu |

(Continued)

FOREIGN PATENT DOCUMENTS

| KR | 1020050051223 | 6/2005 |
| KR | 1020110065437 | 6/2011 |

OTHER PUBLICATIONS

European Patent Office (ISA), International Search Report and Written Opinion dated Jun. 9, 2017 for PCT International Application No. PCT/EP2017/057471, international filing date Mar. 29, 2017, priority date Mar. 31, 2016.
(Continued)

*Primary Examiner* — Nicholas R Taylor
*Assistant Examiner* — Tania M Pena-Santana
(74) *Attorney, Agent, or Firm* — Law Office of Andrei D Popovici, PC

(57) ABSTRACT

Described systems and methods enable an automatic device detection/discovery, particularly of 'Internet of Things' client devices such as wearables, mobile communication devices, and smart home appliances, among others. Device detection comprises assigning a target device to a device category, such as "tablet computer from an unknown manufacturer, running Android®". Some embodiments determine multiple preliminary category assignments according to distinct inputs such as HTTP user agent data, DHCP data, mDNS data, and MAC data. Each preliminary category assignment may come with an associated score. A definitive category assignment may be made according to an aggregate score. Applications include computer security, software provisioning, and remote device management, among others.

23 Claims, 10 Drawing Sheets

(51) Int. Cl.
*H04L 12/28* (2006.01)
*H04L 29/12* (2006.01)

(52) U.S. Cl.
CPC ........ *H04L 41/046* (2013.01); *H04L 41/0893* (2013.01); *H04L 61/2015* (2013.01)

(56) References Cited

U.S. PATENT DOCUMENTS

| | | |
|---|---|---|
| 8,891,404 B2 | 11/2014 | Bertani et al. |
| 8,923,841 B2 | 12/2014 | Thorstensson et al. |
| 9,135,293 B1 | 9/2015 | Kienzle et al. |
| 2003/0112765 A1 | 6/2003 | Gaspard et al. |
| 2007/0083679 A1* | 4/2007 | Kikuchi ................ G06F 9/4411 710/8 |
| 2010/0257158 A1* | 10/2010 | Sugaya ............... H04L 12/2809 707/723 |
| 2011/0184576 A1* | 7/2011 | Hasan .................... G01D 4/002 700/293 |
| 2014/0068030 A1 | 3/2014 | Chambers et al. |
| 2015/0089568 A1* | 3/2015 | Sprague ............. H04L 63/0876 726/1 |
| 2015/0131483 A1* | 5/2015 | Colban ................ H04W 48/16 370/254 |

OTHER PUBLICATIONS

KIPO, Office Action dated Sep. 2, 2019 for Korean Patent Application No. 10-2018-7031379.
KIPO, Office Action dated Oct. 11, 2019 for Korean Patent Application No. 10-2018-7031379.

* cited by examiner

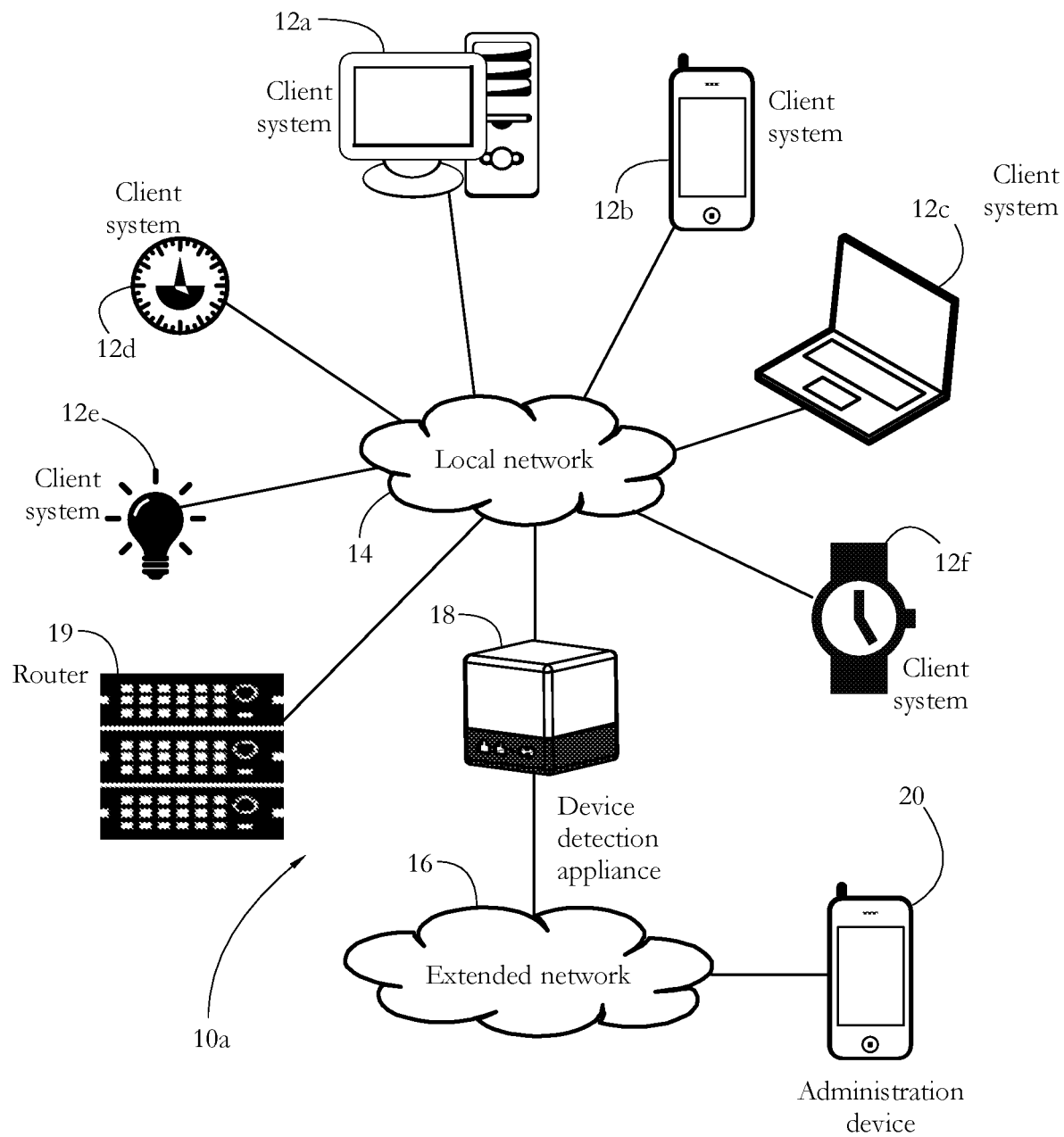
FIG. 1-A

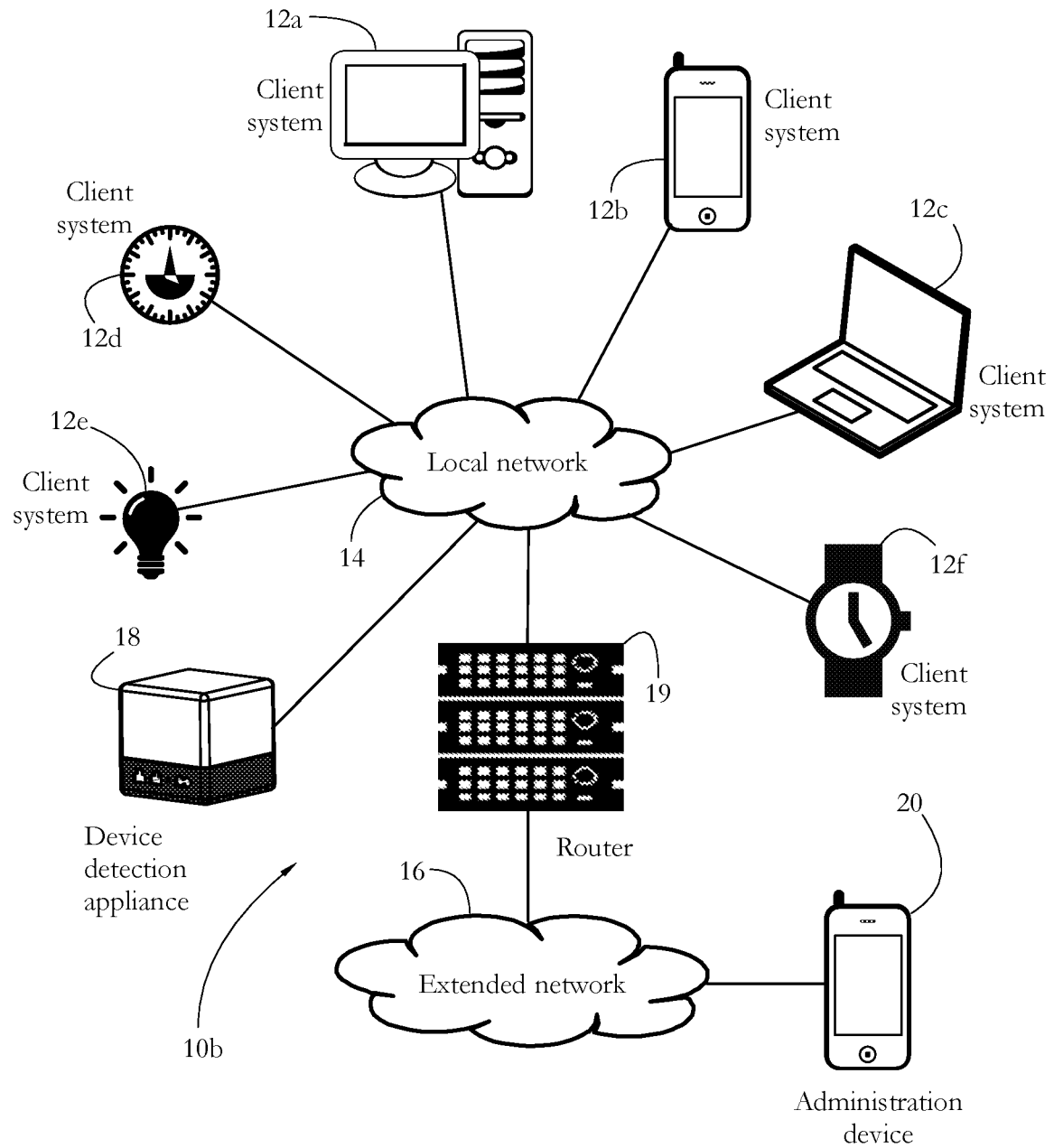
FIG. 1-B

SYSTEMS AND METHODS FOR AUTOMATIC DEVICE DETECTION

RELATED APPLICATIONS

This application claims the benefit of the filing date of U.S. provisional patent application No. 62/315,834, filed on Mar. 31, 2016, entitled "Systems and Methods for Automatic Device Detection," the entire contents of which are incorporated by reference herein.

BACKGROUND

The invention relates to computer security, and in particular to systems and methods for automatic device discovery and remote device management.

Malicious software, also known as malware, affects a great number of computer systems worldwide. In its many forms such as computer viruses, exploits, and spyware, malware presents a serious risk to millions of computer users, making them vulnerable to loss of data and sensitive information, to identity theft, and to loss of productivity, among others.

A great variety of devices, informally referred to as the Internet of Things (IoT), are increasingly being connected to communication networks and the Internet. Such devices include, among others, smartphones, smartwatches, TVs and other multimedia devices, game consoles, home appliances, and various sensors/actuators such as thermostats and intelligent lighting systems. As more such devices go online, they become targets for malicious software and hacking. Therefore, there is an increasing need to secure such devices against malware, as well as to protect communications to and from such devices.

In addition, the proliferation of intelligent devices in environments such as homes and offices creates an increasing problem of device and network management. When each device uses a distinct configuration interface and requires separate connection settings, managing a large number of such devices may become a burden, especially for a typical home user who is not experienced in network administration. Therefore, there is an increasing interest in developing systems and methods for automatic device discovery and configuration, with particular emphasis on security.

SUMMARY

According to one aspect, a device detection appliance comprises a hardware processor and a memory. The hardware processor is configured to analyze data received from a client device connected to the device detection appliance by a local network, to determine a set of features of the client device, and in response, to select a category of devices according to the set of features. The hardware processor is further configured to determine a first score according to a first subset of the set of features, the first score indicative of a first degree to which the client device is representative of the category of devices. The hardware processor is further configured to determine a second score according to a second subset of the set of features, the second score indicative of a second degree to which the client device is representative of the category of devices. The hardware processor is further configured to combine the first and second scores to produce an aggregate score, and in response to producing the aggregate score, to determine whether to assign the client device to the category of devices according to the aggregate score.

According to another aspect, a method comprises employing at least one hardware processor of a device detection appliance to analyze data received from a client device connected to the device detection appliance by a local network, to determine a set of features of the client device, and in response, employing the at least one hardware processor to select a category of devices according to the set of features. The method further comprises employing the at least one hardware processor to determine a first score according to a first subset of the set of features, the first score indicative of a first degree to which the client device is representative of the category of devices. The method further comprises employing the at least one hardware processor to determine a second score according to a second subset of the set of features, the second score indicative of a second degree to which the client device is representative of the category of devices. The method further comprises employing the at least one hardware processor to combine the first and second scores to produce an aggregate score, and in response to producing the aggregate score, employing the at least one hardware processor to determine whether to assign the client device to the category of devices according to the aggregate score.

According to another aspect, a non-transitory computer-readable medium stores instructions which, when executed by at least a hardware processor of a device detection appliance, cause the device detection appliance to analyze data received from a client device connected to the device detection appliance by a local network, to determine a set of features of the client device, and in response, to select a category of devices according to the set of features. The instructions further cause the hardware processor to determine a first score according to a first subset of the set of features, the first score indicative of a first degree to which the client device is representative of the category of devices. The instructions further cause the hardware processor to determine a second score according to a second subset of the set of features, the second score indicative of a second degree to which the client device is representative of the category of devices. The instructions further cause the hardware processor to combine the first and second scores to produce an aggregate score, and in response to producing the aggregate score, to determine whether to assign the client device to the category of devices according to the aggregate score.

BRIEF DESCRIPTION OF THE DRAWINGS

The foregoing aspects and advantages of the present invention will become better understood upon reading the following detailed description and upon reference to the drawings where:

FIG. 1-A shows an exemplary configuration of client systems interconnected by a local network, and a device detection appliance according to some embodiments of the present invention.

FIG. 1-B shows alternative configuration of client systems and device detection appliance according to some embodiments of the present invention.

DETAILED DESCRIPTION OF PREFERRED EMBODIMENTS

Figure 2:
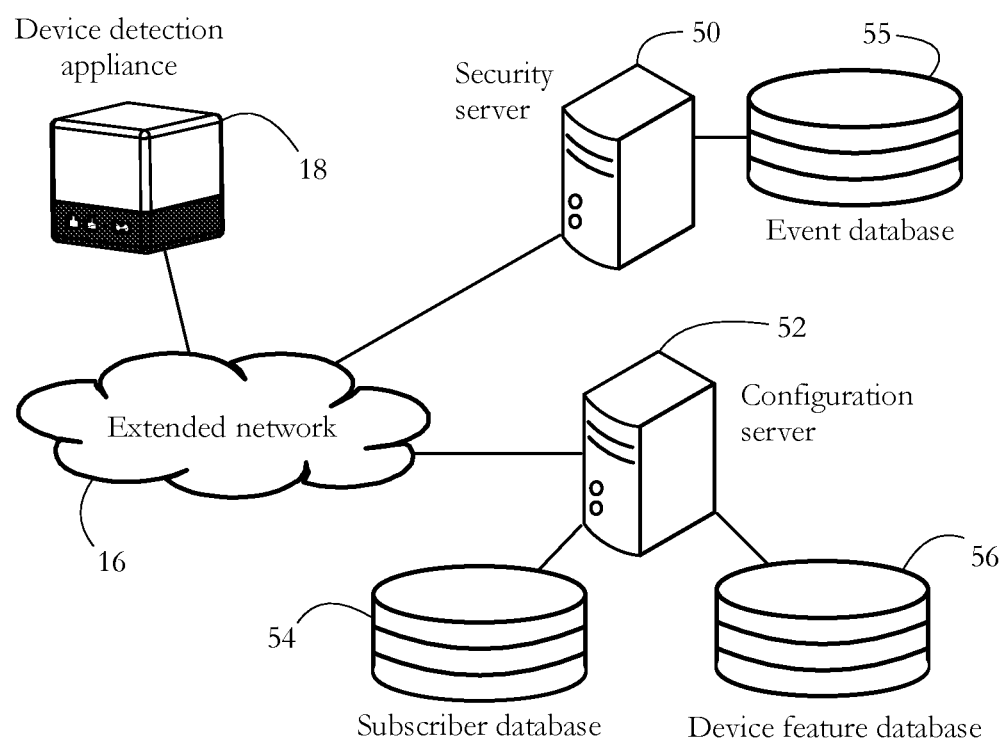
FIG. 2 shows a set of remote servers collaborating with the device detection appliance according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, against unintended or unauthorized modification of data and/or hardware, and against destruction of data and/or hardware. A computer program is a sequence of processor instructions carrying out a task. Computer programs described in some embodiments of the present invention may be stand-alone software entities or sub-entities (e.g., subroutines, libraries) of other computer programs. Two devices are said to be connected to or to belong to the same local network when their network addresses belong to the same subnet and/or when both have the same broadcast address. A local network is a network that has its communication hardware locally managed. A tunnel is a virtual point-to-point connection between two entities connected to a communication network. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

FIGS. 1-A-B show exemplary network configurations 10a-b according to some embodiments of the present invention, wherein a plurality of client systems 12a-f are interconnected by a local network 14, and further connected to an extended network 16, such as the Internet. Client systems 12a-f may represent any electronic device having a processor, a memory, and a communication interface. Exemplary client systems 12a-f include personal computers, laptops, tablet computers, mobile telecommunication devices (e.g., smartphones), media players, TVs, game consoles, home appliances (e.g., refrigerators, thermostats, intelligent heating and/or lighting systems), and wearable devices (e.g., smartwatches, sports and fitness equipment), among others. Local network 14 may comprise a local area network (LAN). Exemplary local networks 14 may include a home network and a corporate network, among others.

Router 19 comprises an electronic device enabling communication between client systems 12a-f and/or access of client systems 12a-f to extended network 16. In some embodiments, router 19 acts as a gateway between local network 14 and extended network 16, and provides a set of network services to client systems 12a-f. The term gateway is used herein to denote a device configured so that at least a part of the communication traffic between client systems 12a-f and extended network 16 traverses the gateway device. Unless otherwise specified, the term network services is used herein to denote services enabling the inter-communication of client systems 12a-f, as well as communication between client systems 12a-f and other entities. Such services may include, for instance, distributing network configuration parameters (e.g., network addresses) to clients systems 12a-f, and routing communication between participating endpoints. Exemplary network services may include a dynamic host configuration protocol (DHCP). DHCP services are typically used for delivering internet protocol (IP) configuration information to clients requesting access to local network 14 and/or extended network 16.

FIGS. 1-A-B further show a device detection appliance 18 connected to local network 14. In some embodiments, device detection appliance 18 comprises an electronic device (e.g., computer system) configured to perform various services for client systems 12a-f. Such services include, among others, computer security services (e.g., anti-malware, intrusion detection, anti-spyware, etc.), device management (e.g., remote configuration of client systems 12a-f), parental control services, secure communication services (e.g., virtual private networking—VPN), and remote technical assistance (e.g., device and/or network troubleshooting).

In some embodiments, device detection appliance 18 is further configured to carry out automatic device discovery/detection operations. The terms 'device discovery' and 'device detection' are herein interchangeable. Device detection comprises determining a device type of a device connected to local network 14, for instance, of any of client systems 12a-f, router 19. Stated differently, device detection comprises automatically assigning the respective device to a device category according to available information about the respective device. In some embodiments, a device category comprises a tuple of device characteristics $\{C_1, C_2, \ldots, C_n\}$ which may include, for instance, a product category (e.g., personal computer, tablet computer, printer, smartwatch, home entertainment system, thermostat, etc.), a manufacturer (e.g., Samsung®, Nest®, Sonos® etc.), a hardware model (e.g., iPad® 2, MacBook® Air®, Galaxy® S6, etc.), and a version of software (e.g., Windows®, iOS® 8, Android® Marshmallow etc.). Some embodiments allow characteristic values of type 'unknown' and/or 'not applicable', as in {'tablet computer', 'unknown', 'Android'}. Device detection activities may be carried out at appliance 18, configuration server 52, or may be divided between appliance 18 and configuration server 52. Methods described herein may also be executed by one of client systems 12a-f.

In a typical scenario according to some embodiments of the present invention, device detection appliance 18 is introduced to a local network already configured and managed by router 19. Appliance 18 may then progressively discover devices connected to the local network, for instance client systems 12a-f and/or router 19. In some embodiments, appliance 18 further takes over network services such as DHCP from router 19 and reconfigures network 14 to place appliance 18 in a gateway position between local network 14 and extended network 16, so that at least a part of the traffic between client systems 12a-f and extended network 16 traverses device detection appliance 18 (see e.g., FIG. 1-A). Placing appliance 18 in a gateway position may be preferable for security reasons, since such a position facilitates interception and analysis of traffic between a client systems and a remote party.

In some embodiments such as the example in FIG. 1-B, router 19 may continue to operate as a gateway to local network 14 after installation of appliance 18, but in such cases device detection appliance 18 is preferably placed between client systems 12a-f and the existing gateway (i.e., router 19), so that appliance 18 belongs to the same local network as client systems 12a-f. Such a position is preferred because it facilitates the delivery of device-specific utility agents to some of client systems 12a-f.

In some embodiments, client systems 12a-f are monitored, managed, and/or configured remotely by a user/administrator, using software executing on an administration device 20 connected to extended network 16 (e.g., the Internet). Exemplary administration devices 20 include smartphones and personal computer systems, among others. Device 20 may expose a graphical user interface (GUI) allowing a user to remotely configure and/or manage operation of client systems 12a-f, for instance to set configuration options and/or to receive notifications about events occurring on the respective client systems.

In some embodiments, device detection appliance 18 collaborates with a set of remote computer systems in order to perform various services for client systems 12a-f. Exemplary remote computer systems include a security server 50 and a configuration server 52, illustrated in FIG. 2. Servers 50 and 52 may comprise individual machines, or clusters of multiple interconnected computer systems. In some embodiments, device detection appliance 18 is configured to redirect some or all of the traffic coming to and/or from client systems 12a-f to security server 50. In such configurations, security server 50 may perform threat detection operations (e.g., malware detection, blocking access to malicious or fraudulent websites, intrusion prevention, etc.), to protect client systems 12a-f against computer security threats. Security server 50 may be further connected to an event database 55 comprising a plurality of security records. In one example, each such security record includes data indicative of a security event occurring on a protected client system, as well as an indicator of an association between the respective event and the respective client system.

In some embodiments, configuration server 52 collaborates with appliance 18 and/or administration device 20 to configure device management and/or security settings of appliance 18, router 19, and/or of a client system 12a-f. Server 52 may be communicatively connected to a subscriber database 54 and to a device feature database 56. Subscriber database 54 may store a plurality of subscription records, each subscription record indicative of a set of client systems under device management according to some embodiments of the present invention. In one embodiment, each subscription record is uniquely associated with a distinct device detection appliance 18. In such embodiments, all client systems configured and/or otherwise serviced by the respective device detection appliance (e.g., client systems 12a-f connected to local network 14 in FIG. 1-A) are associated with the same subscription record. Each subscription record may include an indicator of a subscription period and/or a set of subscription parameters describing, for instance, a desired level of security or a selection of services subscribed for. Subscriptions may be managed according to a service-level agreement (SLA).

In some embodiments, device feature database 56 comprises a set of records indicating configurable features of each client system and/or current configuration settings for each client system. Database 56 may further comprise an exensive device feature knowledgebase comprising a plurality of records. In one exemplary embodiment, each record represents a device, and may comprise a plurality of fields indicating, among others, a product category of the device (e.g., router, smartphone, etc.), a hardware model, a manufacturer, an operating system (e.g., Windows®, Linux®). Other fields may correspond to various device features such as whether the respective device uses a particular network protocol to communicate (e.g., HTTP, Bonjour®), an indicator of a layout of a login interface exposed by the respective device type, user agents used by the respective device, etc.

Figure 3:
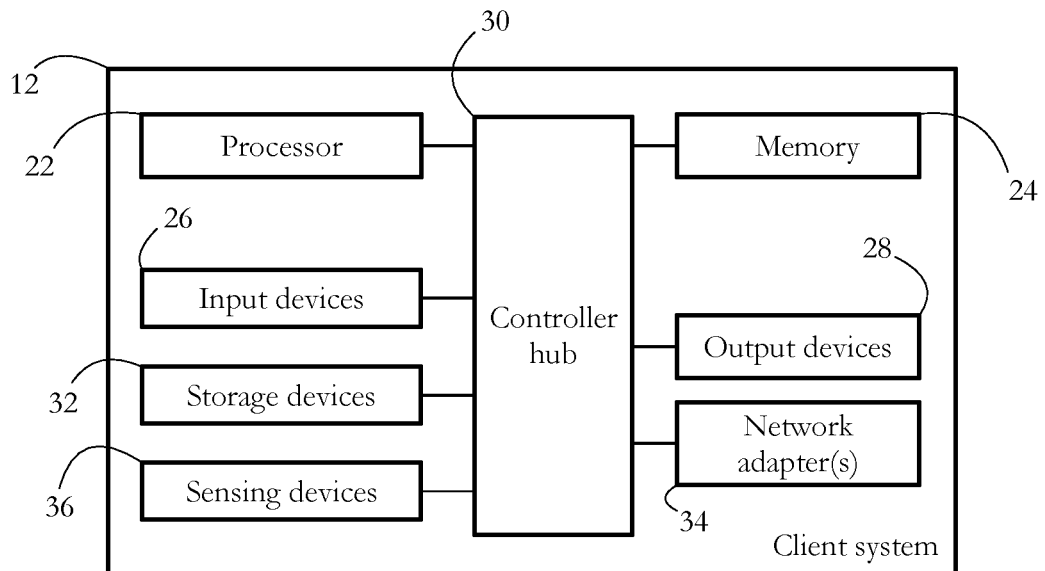
FIG. 3 shows an exemplary hardware configuration of a client system according to some embodiments of the present invention.
Figure 4:
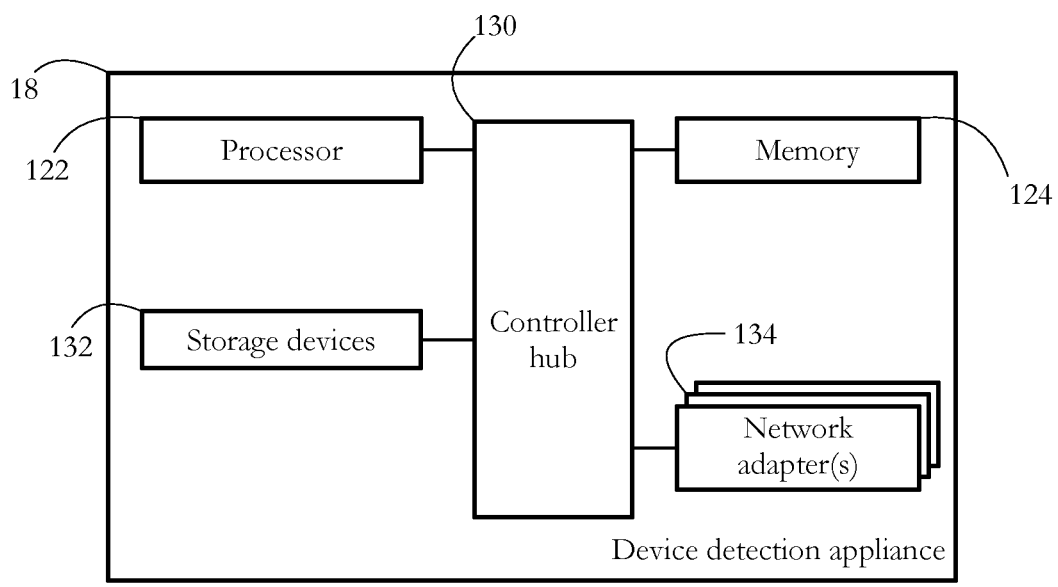
FIG. 4 shows an exemplary hardware configuration of a device detection appliance according to some embodiments of the present invention.
Figure 5:
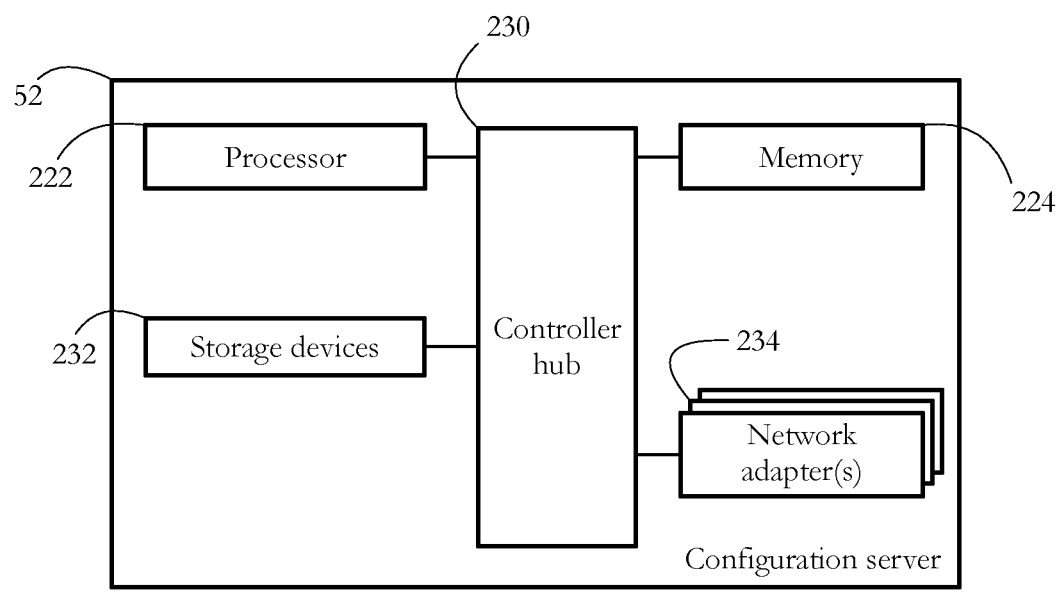
FIG. 5 shows an exemplary hardware configuration of a configuration server according to some embodiments of the present invention.

FIGS. 3-4-5 show exemplary hardware configurations of a client system 12, device detection appliance 18, and configuration server 52, respectively. Client system 12 may represent, for instance, any of client systems 12a-f of FIG. 1. Without loss of generality, the illustrated configurations correspond to computer systems. The hardware configuration of other client systems (e.g., tablet computers, smart watches) may differ from the one illustrated in FIG. 3. Each of processors 22, 122, and 222 comprises a physical device (e.g. microprocessor, multi-core integrated circuit formed on a semiconductor substrate) configured to execute computational and/or logical operations with a set of signals and/or data. Memory units 24, 124, and 224 comprise volatile computer-readable media (e.g. RAM) storing data/signals accessed or generated by processors 22, 122, and 222, respectively, in the course of carrying out operations.

Input devices 26 may include computer keyboards, mice, and microphones, among others, including the respective hardware interfaces and/or adapters allowing a user to introduce data and/or instructions into the respective system.

Output devices 28 may include display devices such as monitors and speakers among others, as well as hardware interfaces/adapters such as graphic cards, allowing the respective system to communicate data to a user. In some embodiments, input and output devices share a common piece of hardware (e.g., touch-screen). Storage devices 32, 132, and 232, include computer-readable media enabling the non-volatile storage, reading, and writing of software instructions and/or data. Exemplary storage devices include magnetic and optical disks and flash memory devices, as well as removable media such as CD and/or DVD disks and drives.

Network adapters 34, 134, and 234 enable client system 12, device detection appliance 18, and configuration server 52, respectively, to connect to an electronic communication network such as networks 14, 16, and/or to other devices/computer systems.

Controller hubs 30, 130, and 230, generically represent the plurality of system, peripheral, and/or chipset buses, and/or all other circuitry enabling the communication between the processor of each respective system and the rest of the hardware components. In an exemplary client system 12 (FIG. 3), hub 30 may comprise a memory controller, an input/output (I/O) controller, and an interrupt controller. Depending on hardware manufacturer, some such controllers may be incorporated into a single integrated circuit, and/or may be integrated with the processor.

Figure 6:
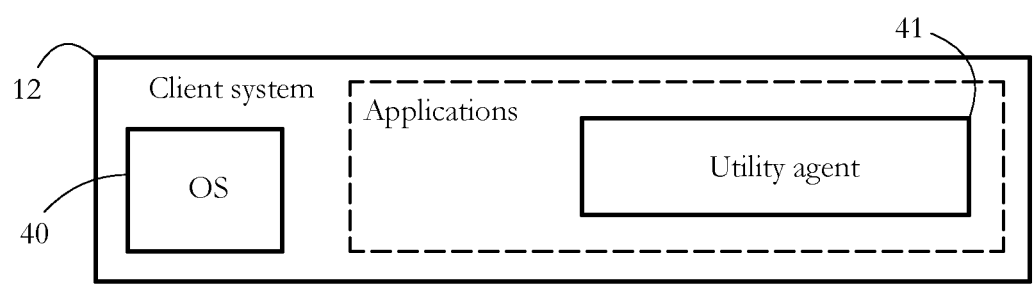
FIG. 6 shows a set of exemplary software components executing on a client system according to some embodiments of the present invention.

FIG. 6 shows exemplary software components executing on client system 12 according to some embodiments of the present invention. Such software may include an operating system (OS) 40 providing an interface between the hardware of client system 12 and a set of software applications executing on the respective client system. Examples of operating systems include Microsoft® Windows®, MacOS®, iOS®, and Android, among others. Software applications may include word processing, graphics, games, browser, and communication applications, among others. In some embodiments, software applications executing on client system 12 include a utility agent 41 configured to provide various services to the respective client system, such as device management and/or security services (e.g., anti-malware). In one example, utility agent 41 is configured to access and/or modify a set of configuration options of client system 12 (e.g., network configuration parameters, power management parameters, security parameters, device-specific parameters such as a desired temperature in the case of a remotely controlled thermostat, or a selection of lights in the case of a remotely controlled home lighting manager, etc.). In some embodiments, the installation of agent 41 on client system 12 is initiated and/or facilitated by device detection appliance 18.

Figure 7:
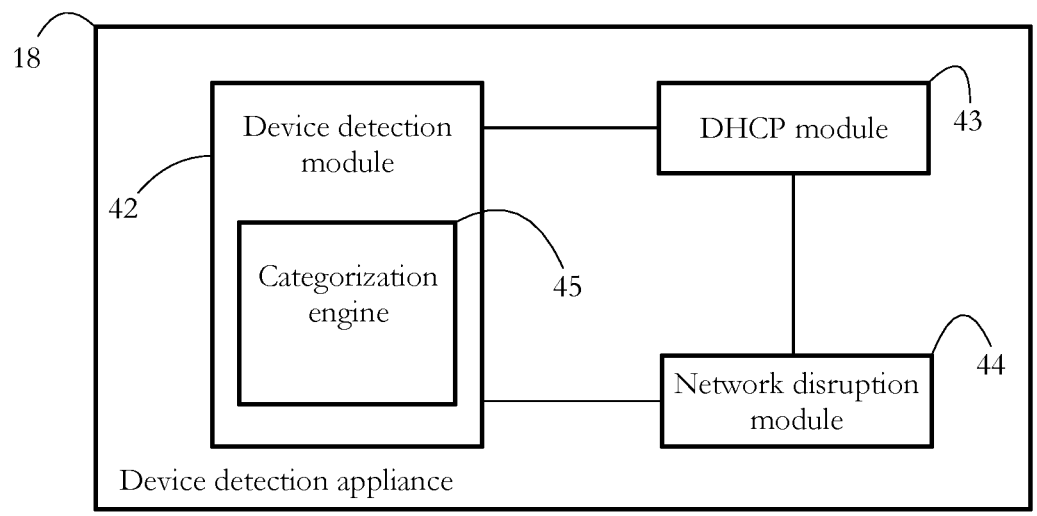
FIG. 7 shows an exemplary set of software components executing on the device detection appliance according to some embodiments of the present invention.

FIG. 7 shows a set of software components executing on device detection appliance 18 according to some embodiments of the present invention. Such components may include, among others, a device detection module 42 and a DHCP module 43 providing DHCP services for local network 14. Such services may include delivering IP configuration information to clients requesting access to local network 14 and/or to extended network 16. Device detection module 42 may include a categorization engine 45, and may be configured to collaborate with configuration server 52 to automatically determine a device type of client system 12, as shown in detail below. In some embodiments, appliance 18 further executes a network disruption module 44 configured to perform a network service takeover from router 19. In a particular example, in response to determining a device category of router 19, appliance 18 may use disruption module 44 to shut down or otherwise incapacitate the DHCP server of router 19, in order to take over network services from router 19. In one such example, device detection appliance 18 may transmit a sequence of instructions to router 19, the sequence of instructions crafted to cause a crash or a shutdown of router's DHCP server. In another example, appliance 18 may cause router 19 to expose a configuration interface, and may transmit a set of configuration parameter values to the respective interface, thus causing the router's DHCP server to shut down. The set of instructions and/or configuration parameter values may be selectively chosen according to the detected category of router 19.

Figure 8:
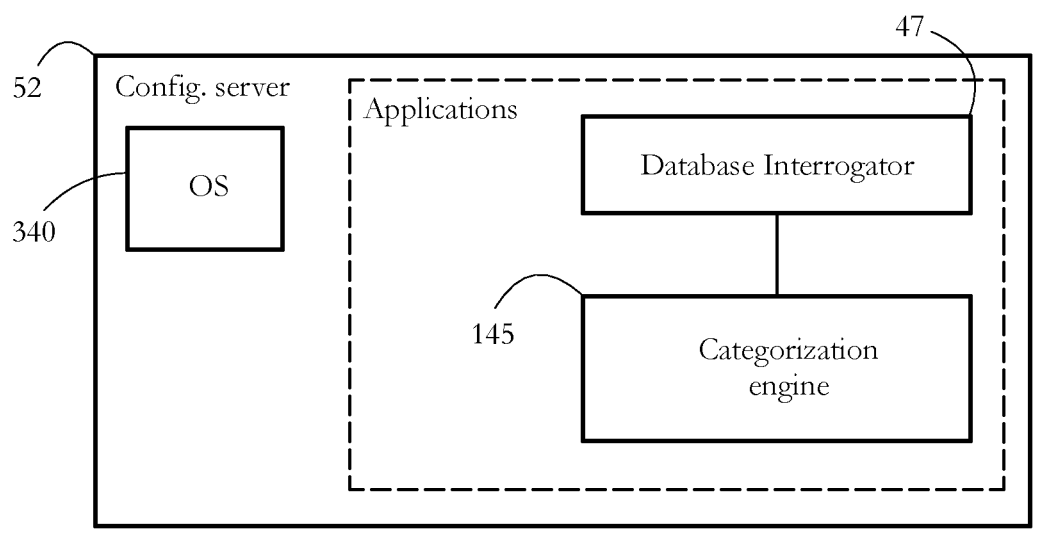
FIG. 8 shows exemplary software executing on a configuration server according to some embodiments of the present invention.

FIG. 8 shows exemplary software executing on configuration server 52 according to some embodiments of the present invention. Such software may include a server-side categorization engine 145 and a database interrogator 47. Engine 145 may complement device discovery/detection activities of engine 45 executing on device detection appliance 18. Database interrogator 47 may be configured to selectively retrieve data from device feature database 56 at the request of categorization engine(s) 45 and/or 145.

Figure 9:
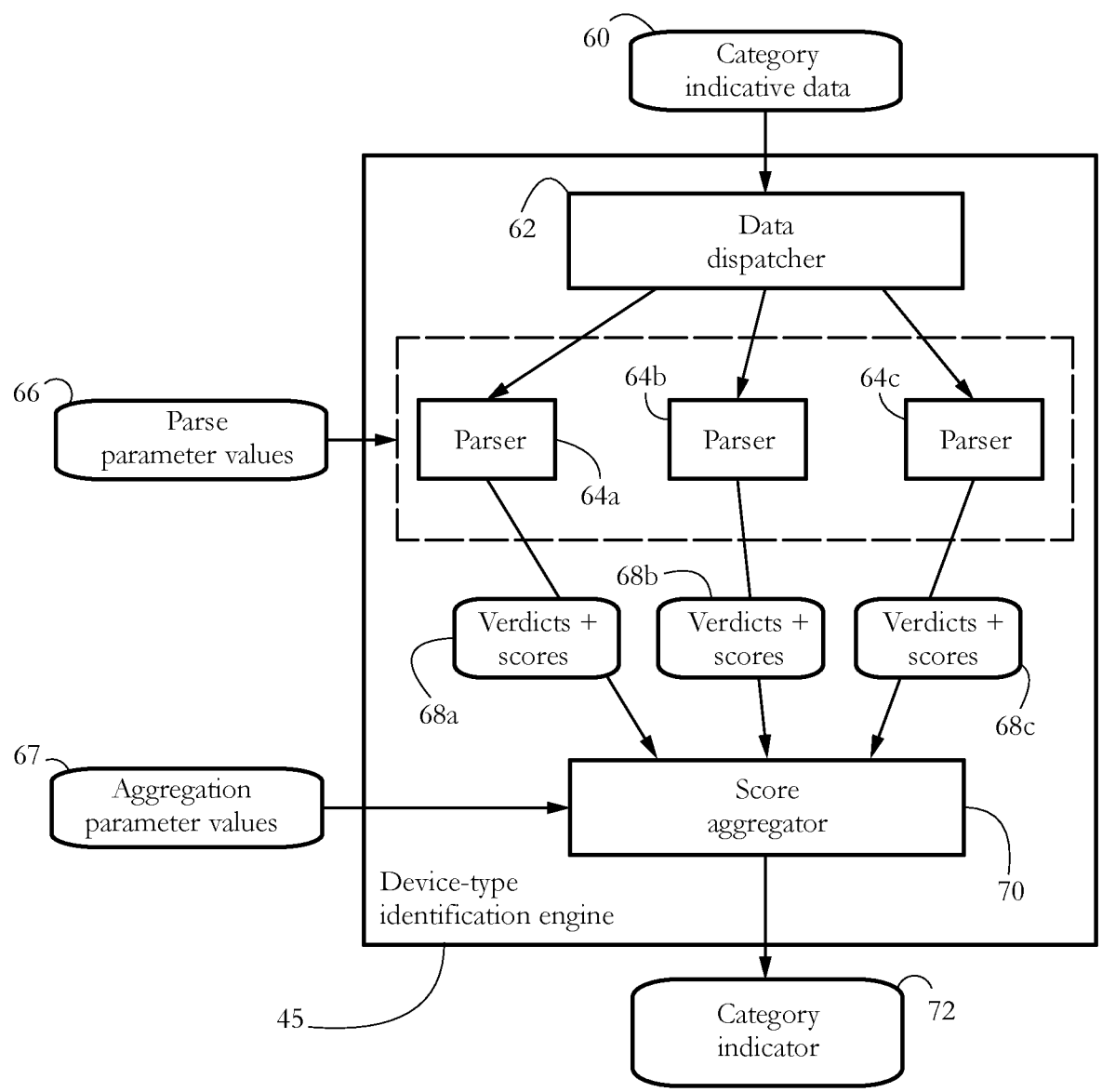
FIG. 9 illustrates exemplary components of a categorization engine according to some embodiments of the present invention.

FIG. 9 shows an exemplary configuration of categorization engine 45 according to some embodiments of the present invention. Engine 145 executing on server 52 may have a similar configuration. Engine 45 receives as input a set of category-indicative data 60 of a client system, and outputs a category indicator 72 indicative of a device type of the respective client system (e.g., mobile telephone running iOS® version 9.2). Category-indicative data 60 comprises various kinds of data usable to determine the device type of a client system, i.e., to assign the device to a category of devices. Such data may be Boolean (e.g., indicating whether the respective device has a particular feature or not), numeric (e.g., as in a network address), of type string (e.g., as in host names and user agent fields), etc. Some exemplary data 60 include:

a) Hardware ID indicators, such as a Media Access Control (MAC) address and/or an International Mobile Equipment Identity (IMEI) number of the respective client system. The MAC address is 48 bits in length, and is typically indicative of a manufacturer of the respective device. For instance, the first 24 bits of the MAC address of all Nest® devices are 18:B4:30. Combining the MAC address with knowledge of what types of devices the respective manufacturer produces (in the case of Nest®, IP cameras, thermostats and smoke detectors) may allow an efficient identification of a device type of the respective client system.

b) Supported communication protocols. Some devices advertise specific network services, such as Bonjour®, etc. Some such services are more frequently associated with a device type, manufacturer, etc. For instance, Bonjour® is predominantly encountered on Apple® devices.

c) DHCP parameters such as a vendor name, a fingerprint, and a hostname of the respective client system. The DHCP fingerprint is an array of option values that are specific for some DHCP clients. For example, '1, 3, 6' is common for devices from the Internet of Things (IoT) category. The DHCP vendor name comprises an identifier of the client system's particular DHCP implementation. For instance, 'MSFT' is a common vendor name for the Windows DHCP client. The hostname can be manually set by a user, but it often comprises a default name set by the manufacturer. Certain patterns of these default hostnames may identify the respective client system as belonging to a particular category of devices. For instance, default hostnames starting with the 'NP-' prefix are common to Roku® media players.

d) User agent indicators extracted from a header of a HTTP request. User agent indicators include a set of identifiers for the model, operating system or the browser/application that issued the respective request. For instance, a common pattern for browsers is "Mozilla/[version] ([system and browser information]) [platform] ([platform details])".

e) Multicast Domain Name System (mDNS) service indicators. mDNS is a zero-configuration service that resolves hostnames to IP addresses in the absence of a conventional domain name server. Several devices use mDNS to advertise a set of services and ports. Additional category-indicative information may be obtained from the TEXT field. mDNS services are popular among Apple devices, printers, or network attached storages. For example, most printers advertise the service 'printer' over mDNS.

f) Simple Network Management Protocol (SNMP) parameters. SNMP is a is a network protocol for exchanging management information among connected devices. A device with a SNMP server broadcasts and OID (Object Identifier), an example of which is reproduced below:

Iso(1). org(3). dod(6). internet(1). private(4). transition (868). products(2). chassis(4). card(1). slotCps(2). -cpsSlotSummary(1). cpsModuleTable(1). cpsModuleEntry(1). cpsModuleModel(3). 3562. 3

The content of various fields can be approximately mapped to certain device types and models.

Some embodiments process data 60 to extract a set of device features of the device, wherein each feature comprises a set of an attribute-value pair of the respective device. Exemplary features include a DHCP feature, a MAC feature, and a user agent feature, among others. A device feature may be determined according to multiple data items (e.g., by combining multiple attribute values, as in "attribute: value1 OR value2 AND NOT value3" etc.).

In some embodiments, categorization engine 45 (FIG. 9) comprises a data dispatcher 62, a plurality of data parsers 64a-c, and a score aggregator 70 coupled to data parsers 64a-c. Each parser 64a-c may determine a set of verdicts according to a set of category-indicative data 60, or according to a set of features of a client device. Each verdict indicates a possible device category of client system 12. Exemplary verdicts include "client system 12 is a router from Apple®", "client system 12 is an Android device", and "client system 12 is a tablet computer from an unknown manufacturer, running Windows Mobile® 6.5".

Each parser 64a-c may further determine a score accompanying each verdict. In some embodiments, the score indicates a degree to which client system 12 is representative of the respective category. For instance, a score may quantify how representative client system 12 is of a smartwatch, or of an Apple® device, or of a device running Android®. Higher scores may indicate higher representativeness of the respective category (for instance, that the device is a typical member of the category). The degree of representativeness of a category may include, among others, a degree of membership of client system 12 in the respective category, a likelihood or confidence level that client system 12 belongs to the respective category, and a measure of similarity between client system 12 and the respective category. Scores may be Boolean (I/0, YES/NO) or vary continuously within a set of bounds. In one example, each score is scaled to a number between 0 and 100.

In some embodiments, each parser 64a-c is configured to receive as input a distinct subset of category-indicative data, or a distinct subset of device features. For instance, parser 64a may process DHCP data/features, parser 64b may parse user agent text strings extracted from HTTP requests, etc. In another example, parser 64a processes a first field of a user agent data type, parser 64b processes a second field of the user agent, etc. Distinct subsets of features are not necessarily mutually-exclusive; some distinct subsets of features may have a partial overlap. Data dispatcher 62 may be configured to selectively send each type of category-indicative data to parsers 64a-c that use the respective data type/feature as input. In an alternative embodiment, distinct parsers 64a-c may process the same subset of features, but may employ distinct algorithms to produce parser-specific verdicts and/or score values. In one such example, one parser processes mDNS data according to a set of heuristics, and another parser processes mDNS data using a neural network.

When device categories comprise multiple characteristics $\{C_1, C_2, \ldots, C_n\}$ wherein n>1, some parsers output an array of verdict/score pairs, each member of the array representing a distinct combination of characteristics. In one such example wherein category characteristics comprise {category, OS}, wherein the 'category' field can take the values {phone, PC}, and wherein the 'OS' field can take the values {Windows, Android, iOS}, scores may be visualized as a 2-dimensional matrix:

$$\begin{bmatrix} \sigma_{phone,Windows}^{(i)} & \sigma_{phone,Android}^{(i)} & \sigma_{phone,iOS}^{(i)} \\ \sigma_{PC,Windows}^{(i)} & \sigma_{PC,Android}^{(i)} & \sigma_{PC,iOS}^{(i)} \end{bmatrix}, \quad [1]$$

wherein $\sigma_{phone,Windows}^{(i)}$ denotes a score indicating how representative client system 12 is of a smartphone running Windows®, while i indexes parsers. In general, such arrays are sparse, since not all possible combinations of device characteristics occur in practice. For instance, no Android printers are currently on the market, so a verdict of {printer, Android} may not exist or may be so rare that its use may not be justified.

Some embodiments derive knowledge from a vast corpus of records representing devices of various kinds (smartphones, thermostats, laptops, routers, printers, etc.). Device feature data may be acquired from technical documentation and/or from testing, and may be obtained automatically or by human operators. Device feature data may be stored in device feature database 56. Corpus records may be grouped into categories according to various criteria. Such grouping may be done by human operators, or may be achieved automatically using techniques such as supervised or unsupervised learning.

Each parser 64a-c may implement a distinct algorithm for determining verdicts and scores. Some embodiments represent each corpus device as a point in multidimensional feature space. Such representations may allow a reverse lookup, i.e. an identification of a device category according to a set of feature values. A particular set of device feature values may match multiple categories. Some embodiments of parsers 64a-c employ automated classifiers such as neural networks capable of returning a set of verdicts and/or scores given a set of device features. Other parsers may use fuzzy logic techniques such as membership functions to determine verdicts and scores of client system 12. Yet other parsers may rely on statistical methods. In some embodiments, scores may be determined empirically, for instance according to a set of heuristics. Parsers configured to process text strings (e.g., user agent indicators) may use pattern matching against a collection of category-identifying signatures.

An exemplary parser configured to process DHCP data may operate as follows. In a first phase of detection, the parser attempts to match both the dhcp fingerprint and dhcp vendor of client system 12 against the corpus of devices. If the match is successful, the respective verdict(s) are passed to score aggregator 70 with a maximum score (e.g., 100). In case there is no exact match for both fields, an attempt is made to match only the dhcp fingerprint. To prevent promoting incorrect verdicts, the score of each verdict derived by matching the DHCP fingerprint is chosen according to a measure of similarity (e.g., an inter-string distance such as Levenshtein) between the DHCP vendor of the respective verdict and the DHCP vendor of client system 12.

In some embodiments, score aggregator 70 centralizes, compares and/or combines verdicts 68a-c produced by individual parsers 64a-c to output a decisive verdict for the respective client system. The decisive verdict definitively assigns client device 12 to a device category. To combine individual verdicts, score aggregator 70 may use any method known in the art. In one exemplary embodiment, a decisive verdict is chosen as the verdict having the highest score across multiple data types and/or parsers:

$$V = \operatorname*{argmax}_{v \in \Omega}\left(\max_{i \in S} \sigma_v^{(i)}\right), \qquad [2]$$

wherein $\sigma_v^{(i)}$ denotes a score associated with verdict v, determined according to data type or feature i, wherein S denotes the set of all data types/features, and wherein $\Omega$ denotes the set of all verdicts (category indicators). In an alternative embodiment, $\sigma_v^{(i)}$ denotes a score determined by parser i for verdict v.

One problem encountered in practice when using formula [2] is that quite often multiple individual verdicts v come with an identical score $\sigma_v^{(i)}$, so there may be no unambiguous decisive verdict. Examples of such situations are given further below.

An alternative embodiment determines a decisive verdict according to an aggregate score computed for each verdict v as a combination of individual scores $\sigma_v^{(i)}$ obtained according to distinct data types/features, according to distinct algorithms, and/or computed by distinct parsers 64a-c. In one such example, an aggregate score is computed according to a weighted sum of individual scores:

$$\sigma_v^{(A)} = \sum_{i \in S} \sigma_v^{(i)} \cdot w^{(i)}, \qquad [3]$$

and hence $$V = \operatorname*{argmax}_{v \in \Omega}(\sigma_v^{(A)})$$

wherein $\sigma_v^{(A)}$ denotes the aggregate score computed for verdict v, and wherein $w^{(i)}$ denotes a numerical weight associated with data type/feature i and/or with the parser that produced score $\sigma_v^{(i)}$. When all weights $w^{(i)}$ are equal, formula [3] amounts to computing the aggregate score as a mean of the set of individual scores.

In some embodiments, weight $w^{(i)}$ represents an indicator of a reliability of the respective parser and/or data type in producing a correct category assignment. Some data types (e.g., user agent data, hostname) may be rather non-specific or may lead to false verdicts with relatively high scores. To avoid such situations, the respective data types and/or parsers utilizing the respective data types may receive a lower weight $w^{(i)}$ than other, more reliable data/types or parsers. In some embodiments, the weight $w^{(i)}$ may further vary according to the verdict: $w^{(i)} = w^{(i,v)}$, wherein $w^{(i,v)}$ denotes a relevance of data source and/or parser i to the respective verdict v. Some data types may be more relevant to some verdicts than others. For instance, mDNS data may be more relevant for the detection of printers than hostname data. Although such reliability/relevance information may already be incorporated to some extent into scores, some embodiments use verdict and/or parser-specific weights as an artifice to break a score tie and thus produce an unambiguous category assignment.

In one example of verdict- and/or parser-specific weights, Ecobee, Inc. (MAC prefix 44:61:32) and Sonos, Inc. (MAC prefix b8:e9:37) produce very few devices, which may therefore be identified unambiguously using the MAC address. The MAC parser/data type may therefore receive a relatively high weight in score aggregation for Ecobee and/or Sonos verdicts. In another example, for Nest® devices, an empty hostname typically indicates an IP camera. Some embodiments may thus associate relatively high weights with Nest verdicts and hostname parsers. In yet another example, an Apple® device whose mDNS data show a network service of type "airport.tcp" is very likely to be a router. Therefore, higher weights may be associated with mDNS parsers and Apple® verdicts. Similarly, an Amazon® device having the DHCP fingerprint "1, 3, 6, 12, 15, 28, 42" is very likely a Kindle® e-book reader. Some embodiments may therefore employ a relatively weight when aggregating scores for Amazon verdicts and DHCP parsers.

Weights $w^{(i)}$, $w^{(i,v)}$ may be determined according to trial and error, or using a machine learning algorithm. They may be repeatedly tweaked in order to optimize device detection in a continuously evolving Internet of Things. The weights may be further scaled to normalize the aggregate score, i.e., to keep score $\sigma_v^{(A)}$ within desired bounds.

In some embodiments, determining the aggregate score comprises modulating individual scores $\sigma_v^{(i)}$ according to an absolute or relative size of the respective scores. For instance, $$\sigma_v^{(A)} = \Sigma_{i \in S} w^{(i)} \cdot M(\sigma_v^{(i)}), \qquad [4]$$

wherein $M(\cdot)$ denotes a modulation function. One exemplary embodiment using a variation of formula [4] computes the aggregate score according to the largest and smallest of the individual scores:

$$\sigma_v^{(A)} = w_1 \max_{i \in S} \sigma_v^{(i)} + w_2 \min_{i \in S} \sigma_v^{(i)}. \qquad [5]$$

In another exemplary calculation, the largest and smallest individual scores are discarded, and the aggregate score is computed as the average of the remaining scores. Another exemplary embodiment may determine the aggregate score as the median of the set of individual scores. In yet another example, M is an injective function (e.g., ever-increasing). Variations such as illustrated in formulae [4] and [5] address the issue of ambiguous category assignment: after applying formula [1] or [2], there may be multiple candidate verdicts with substantially similar aggregate scores. In practice, this means that categorization engines 45, 145 cannot decide on a unique category for the respective device. Some embodiments therefore resort to score modulation to break the tie. Some M functions, for instance, additionally promote reliable parsers in an effort to break an aggregate score tie.

In other exemplary calculation of the aggregate score, some individual scores $\sigma_v^{(i)}$ may be modulated by a weight $w^{(i)}$ determined according to the verdict v associated with the respective score. In one embodiment, non-specific verdicts such as 'unknown device' may be suppressed in this way by being assigned relatively small weights during aggregation and decision making.

In some embodiments as illustrated in FIG. 9, parsers 64a-c and/or score aggregator 70 may receive a set of parse parameter values 66 and/or a set of aggregation parameter values 67, respectively, as input for calculating individual scores $\sigma_v^{(i)}$ and/or aggregate score $\sigma_v^{(A)}$. In an embodiment wherein a parser comprises a neural network, parse parameter values 66 may include, for instance, a set of neural network weights of a the respective parser. Aggregation parameter values may include weights $w^{(i)}$, among others. In an exemplary embodiment, parameter values 66 and/or 67 are stored in and selectively retrieved from device feature database 56. By maintaining such parameter values independently of the parser and score aggregation software, some embodiments facilitate optimization and/or upgrade of engines 45, 145.

Figure 10:
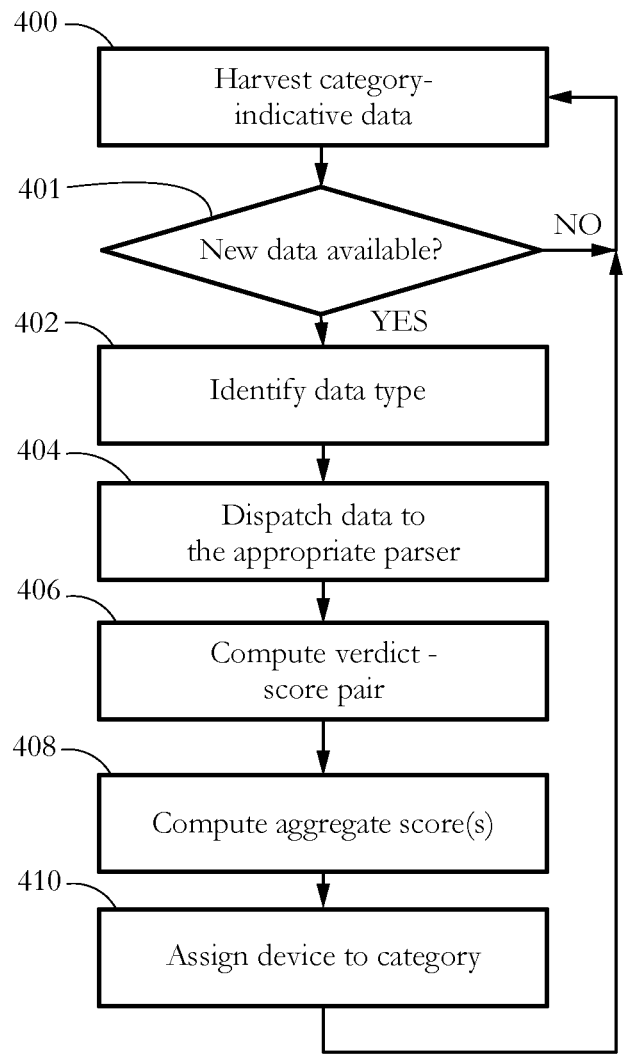
FIG. 10 illustrates an exemplary sequence of steps performed by the categorization engine according to some embodiments of the present invention.

FIG. 10 shows an exemplary sequence of steps performed by categorization engine 45 according to some embodiments of the present invention. Device detection may proceed iteratively, since not all category-indicative data 60 may be available at once. Some data types may be relatively easy to acquire, while others may necessitate relatively lengthy procedures, such as handshake message exchanges, negotiations on network configuration parameters, authentication, etc. Therefore, in some embodiments parsers 64a-c operate independently of each other, each parser responsive to a receipt of category-indicative data/features of the appropriate kind.

Once introduced to local network 14, in a sequence of steps 400-401, some embodiments of device detection appliance 18 may begin to harvest category-indicative data 60 from client systems 12a-f and/or router 19. Harvesting data 60 may depend on a type of the respective data. For instance, device detection appliance 18 may extract a user agent indicator from a HTTP request received from a client system. Some devices broadcast an offer of network services; by intercepting such messages, appliance 18 may determine what kind of services and/or protocols the respective devices support. Appliance 18 may further use a service discovery tool such as Network Mapper (NMap). To harvest data about network protocols and services such as Bonjour® and SNMP, some embodiments of appliance 18 send a probe out to a particular port of a client system and listen for a response. When data 60 is available, data dispatcher 42 may identify a data type of the respective data and selectively forward data 60 to the parser(s) that use the respective data type as input (steps 402-404). In a step 406, the respective parser(s) determine a set of candidate verdicts and associated scores. In a sequence of steps 408-410, score aggregator 70 determines a set of aggregate scores and selects a decisive verdict. The decisive verdict may then constitute the output of engine 45. In some embodiments, the category assignment of client system 12 as indicated by the decisive verdict may change in time. As more category-indicative data 60 becomes available, other parsers may start providing candidate verdicts and scores, which aggregator 70 may then combine with previously-computed individual or aggregate scores.

Figure 11:
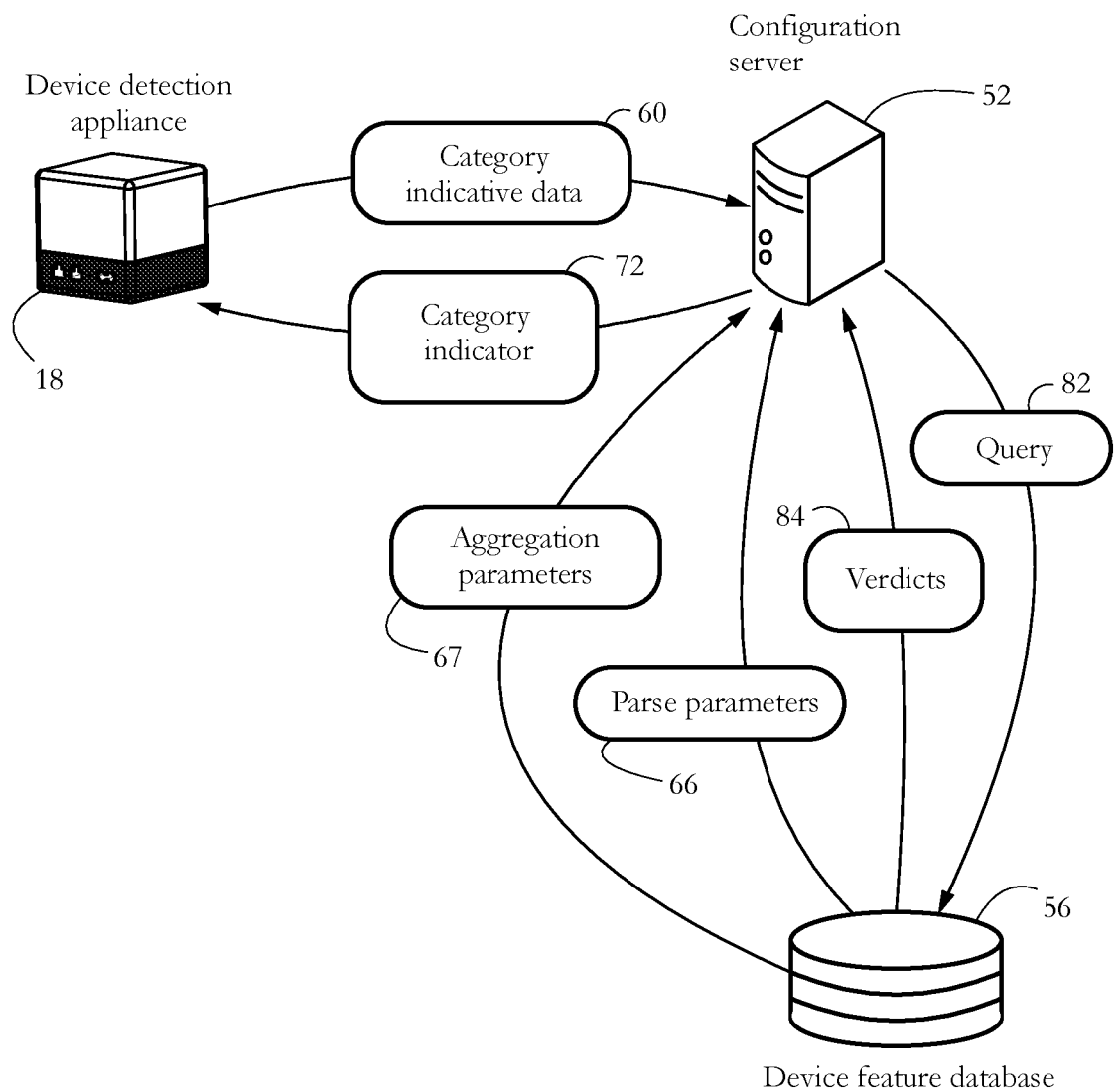
FIG. 11 shows an exemplary data exchange between the device detection appliance and configuration server, performed during a device discovery/detection procedure according to some embodiments of the present invention.

In an alternative embodiment as illustrated in FIG. 11, at least a part of a device detection procedure is carried out at configuration server 52. Category-indicative data 60 harvested by device detection appliance 18 may be transmitted to configuration server 52, which identifies the device type according to the received data and further according to information stored in device feature database 56. Such device detection may be iterative: server 52 may perform a preliminary determination of a device type according to the currently available data about the respective client system. In response to the preliminary determination, server 52 may request further device-type-indicative data about the respective client from device detection appliance 18. More category-indicatoce data is sent to configuration server 52, until a successful category assignment of client system 12 is achieved. Some embodiments divide device detection tasks between engines 45 and 145. In one such example, each engine may compute a set of candidate verdicts and/or scores. Scores may then be aggregated either at appliance 18 or server 52, to produce a decisive verdict.

Information obtained via device detection/discovery may be used in a variety of ways. A few examples include tailoring a set of network services to each client device, installing device-specific software agents on each device, assessing computer security vulnerabilities of each device, and exposing a device-specific set of configuration options to a user of each client device (remote management).

Figure 12:
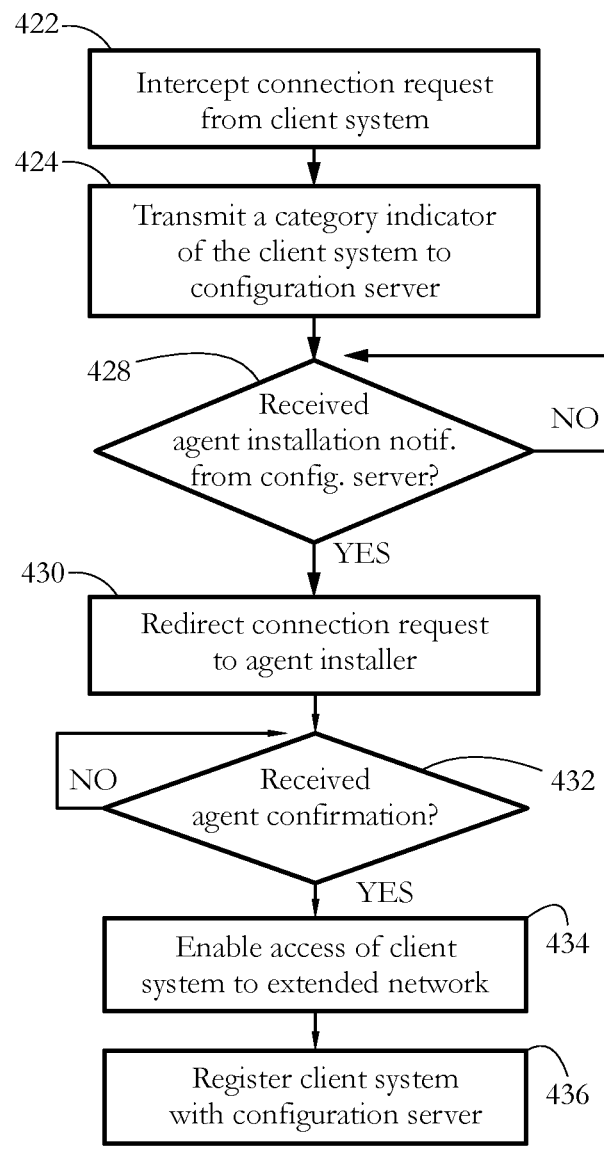
FIG. 12 illustrates an exemplary sequence of steps performed by the device detection appliance during an agent provisioning procedure, according to some embodiments of the present invention.

An exemplary application of some embodiments of the present invention is device-specific software provisioning. FIG. 12 illustrates an exemplary sequence of steps performed by device detection appliance 18 to deliver a utility agent to client system 12 (see e.g., utility agent 41 in FIG. 6). In some embodiments, appliance 18 waits for connection requests from local client systems. An exemplary connection request comprises a HTTP request. When client system 12 attempts to access an address on local network 14 or extended network 16, appliance 18 may intercept the request and in response, may send an indicator of category of client system 12 to configuration server 52. Server 52 may respond with a notification which may include a location indicator (e.g., path, IP address) of an agent installer selected according to the assigned category of client system 12. In response to receiving the notification, device detection appliance 18 may redirect the HTTP request to the location of the agent installer. In an alternative embodiment, appliance 18 may obtain the agent installer from server 52, and then push the installer onto the respective client system.

In some embodiments, the agent installer is configured to cause system 12 (or administration device 20) to expose a confirmation interface to a user, requesting the user to agree to install agent 41. The installer may further request the user to confirm that the user agrees with terms of the respective subscription (e.g. as listed in a SLA). When the user indicates agreement, the installer may install and execute agent 41. In some embodiments, the agent installer and/or device detection appliance 18 may register the respective client system with client configuration server 52, the registration associating the respective client system with a subscription record attached to device detection appliance 18.

A broad variety of utility agents may be provisioned using systems and methods described herein. An exemplary utility agent 41 configured to provide security services may perform a security assessment of client system 12 (e.g., a local malware scan) and may send security assessment data to configuration server 52 or security server 50. The server(s) may then forward a security indicator to administration device 20 for display to the user/administrator. Exemplary security indicators displayed to the user/administrator may include, among others, an indicator of whether a particular software object (e.g., the operating system) executing on client system 12 is up to date, and an indicator of a strength of a password used to protect client system 12. Other exemplary actions performed by a security agent include updating software and/or security policies for the respective client system. In some embodiments, agent 41 is configured to filter network traffic to/from client system 12 using a network packet inspection algorithm to determine, for instance, whether client system 12 is subject to a malicious attack.

An exemplary utility agent 41 configured to provide secure communication services includes a virtual private network (VPN) agent. Such agents may protect client system 12 when client system 12 leaves local network 14 (for instance, when the user leaves home with his/her mobile telephone). Such an agent may collaborate with device detection appliance 18 and/or configuration server 52 to open a secure communication tunnel and/or to set up a VPN between the respective client system and security server 50 (more details below).

An exemplary utility agent 41 configured to provide parental control services may monitor the usage of client system 12, and report usage patterns to a supervisor user (e.g., parent) via administration device 20. Agent 41 may further prevent client system 12 from accessing certain remote resources (e.g., IP addresses, websites, etc.), or from using certain locally-installed applications (e.g., games). Such blocking may be enforced permanently, or according to a user specific schedule.

An exemplary utility agent 41 configured to provide remote technical assistance may automatically configure and/or open a secure communication channel (e.g., an SSH tunnel) between client system 12 and configuration server 52. Configuration and/or troubleshooting commands may then be transmitted from server 52 to client system 12, possibly without explicit involvement or assistance from a user of client system 12.

Some client systems, such as home appliances, wearable devices, etc., may not be capable of installing a utility agent as indicated above. However, such devices may include built-in configuration and/or device management agents enabling a remote command of the respective devices. Some embodiments of the present invention may use the existing management agents and device-specific protocols and/or communication methods to communicate parameter value updates to such devices. Even for such devices, correctly identifying the device category enables configuration server 52 to properly format and communicate configuration commands to the respective client systems. To facilitate category assignment of such client systems, device detection appliance 18 may either actively parse communications received from the respective client system, or re-route the respective communications to configuration server 52.

Some embodiments of the present invention enable an automatic device detection/discovery, particularly applied to 'Internet of Things' client devices, such as wearables, mobile communication devices, and smart home appliances, among others. Such client devices are typically configured to connect to a network, for instance to a wireless LAN or a BLUETOOTH® link. Some embodiments of the present invention are specifically crafted for ease of use, and therefore do not necessitate specialized knowledge of computer engineering or network administration.

In some embodiments, a device detection appliance is connected to the same local network as the detected devices. Exemplary detection/discovery activities include, among others, determining a product category of each client device (e.g., phone, watch, smart TV, printer, router, thermostat, etc.), and determining other device features, such as a make and model of a client device, a type/version of Operating System (OS) used by a client device, a type of a hardware component installed in a client device, etc. The methods described herein are not limited to the device detection appliance. Device detection may be carried out by client systems 12*a-f*, router 19, and/or a remote server.

Some embodiments determine category assignment according to a plurality of distinct criteria, for instance according to distinct category-indicative data sources and/or according to distinct features of the respective device. Such embodiments rely on the observation that using a single criterion/algorithm/feature often leads to an ambiguous or even incorrect category assignment. Examples of such situations are given below.

In one example of category assignment, appliance 18 acquires the following category-indicative data about a client device (Table 1):

TABLE 1

| Type | Info |
| --- | --- |
| MAC | 90:72:40:XX:XX:XX |
| DHCP | "dhcp_fingerprint": "1,2,3,15,6,12,44" |
| mDNS | "service_type": "_airport._tcp" |
| Hostname | airport-express |

A parser using the MAC address returns the verdict/score pairs illustrated in Table 2. As seen here, MAC-based detection yields ambiguous results, with no clear winner.

TABLE 2

| Verdict | Score |
| --- | --- |
| Phone | 14.28 |
| Tablet | 14.28 |
| Desktop | 14.28 |
| Media player | 14.28 |
| Router | 14.28 |
| Network-attached storage (NAS) | 14.28 |
| Watch | 14.28 |

A second set of verdict/score pairs are calculated by another parser using DHCP data, and aggregated with the verdict/score pairs of Table 2. Results of the aggregation are shown in Table 3. Adding the DHCP fingerprint verdict to the MAC verdict has substantially reduced the ambiguity.

TABLE 3

| Verdict | Score |
| --- | --- |
| NAS | 17.15 |
| Router | 17.15 |
| Phone | 13.13 |
| Tablet | 13.13 |
| Desktop | 13.13 |
| Media player | 13.13 |
| Watch | 13.13 |

A third set of verdict/score pairs was computed by another parser based on mDNS data. Aggregation of mDNS verdict scores with the verdict/score pairs in Table 3 yields the result shown in Table 4, which show an unambiguous and correct assignment of client system 12 to the router category.

TABLE 4

| Verdict | Score |
| --- | --- |
| Router | 31.46 |
| NAS | 23.06 |
| Phone | 9.09 |
| Tablet | 9.09 |
| Desktop | 9.09 |
| Media player | 9.09 |
| Watch | 9.09 |

An example of a situation wherein using a single data source/feature produces an incorrect category assignment is shown below. A device provides the category-indicative data shown in Table 5. A conventional device discovery system may conclude according to either 'user agent' data or hostname data that the respective client is an Android device. However, attempting to deploy Android-based software to this client would fail, because the device is actually an Amazon Kindle Fire TV, which uses a custom OS loosely based on Android. The correct category assignment can be achieved by combining user agent, DHCP, mDNS, and MAC data sources.

TABLE 5

| Type | Info |
| --- | --- |
| User agent | "Mozilla/5.0 (Linux; U; Android 4.2.2; en-us; AFTB Build/JDQ39) AppleWebKit/534.30 (KHTML, like Gecko) Version/4.0 Safari/534.30" |
| DHCP | "dhcp fingerprint": "1,33,3,6,15,28,51,58,59" "dhcp vendor" : "dhcpcd-5.5.60" |
| Hostname | android-3243245 |
| mDNS | "service_type" : "_amzn-wplay._tcp" "text" : "n=John's Fire TV, at=+ILQu8pW3opq,mv=2, a=0, tr=tcp, c=72:c2:46:6d:b5:0d" |
| MAC | 74:75:48:XX:XX:XX |

In another example, a client system provides the category-indicative data shown in Table 6. Using only the mDNS data, a conventional device discovery system may conclude that this device is a printer, since IPP and IPPS services are mostly used by printers. But the MAC indicates an Apple® device, and Apple® does not currently produce printers. Using hostname data alone cannot guarantee a successful detection either, since hostnames may be arbitrarily chosen by the user. However, combining MAC, hostname, and user agent data allows offsetting the misleading information provided by the mDNS data, to produce the correct category assignment: personal computer running OS X®.

TABLE 6

| Type | Info |
| --- | --- |
| mDNS | "service type" : "_ipp. tcp" "service type" : "_ipps. tcp" ... |
| User agent | "Mozilla/5.0 (Macintosh; Intel Mac OS X 10 11 3) AppleWebKit/537.36 (KHTML, like Gecko) Chrome/48.0.2564.97 Safari/537.36" |
| Hostname | Jamess-MacBook-Pro |
| MAC | 3C:07:54:XX:XX:XX |

It will be clear to one skilled in the art that the above embodiments may be altered in many ways without departing from the scope of the invention. Accordingly, the scope of the invention should be determined by the following claims and their legal equivalents.

What is claimed is:

1. A device detection appliance comprising a hardware processor and a memory, the hardware processor configured to:
   in response to receiving a set of data from a client device connected to the device detection appliance by a local network, select a candidate category from a plurality of pre-determined device categories, the candidate category characterized by a selected hardware device type co-occurring with a selected operating system;
   determine a first score according to a first subset of the set of data, the first score indicative of a first degree to which the client device is representative of the candidate category;
   determine a second score according to a second subset of the set of data, the second score indicative of a second degree to which the client device is representative of the candidate category;
   combine the first and second scores to produce an aggregate score computed according to σ·w, wherein σ denotes the first score and w denotes a numerical weight determined according to the candidate category; and
   in response to producing the aggregate score, determine whether the client device belongs to the candidate category according to the aggregate score.

2. The device detection appliance of claim 1, wherein the aggregate score is determined according to:

$$w \cdot f(\sigma),$$

wherein σ denotes the first score, w denotes a numerical weight determined according to the first set of features, and wherein $f(\sigma)$ denotes a modified first score determined by applying an injective function $f$ to the first score.

3. The device detection appliance of claim 1, wherein the hardware processor is further configured to:
   in response to determining whether the client device belongs to the candidate category, when the client device belongs to the candidate category, transmit an indicator of a location of an agent installer to the client device, the agent installer selected from a plurality of agent installers according to the candidate category, wherein the agent installer is configured to install a software agent on the client device, the software agent configured to protect the client device against computer security threats.

4. The device detection appliance of claim 1, wherein the hardware processor is further configured to:
   in response to determining whether the client device belongs to the candidate category, when the client device belongs to the candidate category, identify a computer security vulnerability of the client device according to the candidate category.

5. The device detection appliance of claim 1, wherein the client device is configured to assign network addresses to other client devices connected to the local network, and wherein the hardware processor is further configured to:
   in response to determining whether the client device belongs to the candidate category, when the client device belongs to the candidate category, formulate a set of instructions according to the candidate category, the set of instructions configured, when executed by the client device, to render the client device unable to assign network addresses to the other client systems; and in response to formulating the set of instructions, transmit the set of instructions to the client device.

6. A method comprising employing at least one hardware processor of a device detection appliance to:

in response to receiving a set of data from a client device connected to the device detection appliance by a local network, select a candidate category from a plurality of pre-determined device categories, the candidate category characterized by a selected hardware device type co-occurring with a selected operating system;

employing the at least one hardware processor to determine a first score according to a first subset of the set of data, the first score indicative of a first degree to which the client device is representative of the candidate category;

employing the at least one hardware processor to determine a second score according to a second subset of the set of data, the second score indicative of a second degree to which the client device is representative of the candidate category;

employing the at least one hardware processor to combine the first and second scores to produce an aggregate score computed according to $\sigma \cdot w$, wherein $\sigma$ denotes the first score and w denotes a numerical weight determined according to the candidate category; and in response to producing the aggregate score, employing the at least one hardware processor to determine whether the client device belongs to the candidate category according to the aggregate score.

7. The device detection appliance of claim 1, wherein the aggregate score is determined according to:

$$w \cdot f(\sigma),$$

wherein $\sigma$ denotes the first score, w denotes a numerical weight determined according to the first set of features, and wherein $f(\sigma)$ denotes a modified first score determined by applying an injective function $f$ to the first score.

8. The method of claim 6, further comprising:

in response to determining whether the client device belongs to the candidate category, when the client device belongs to the candidate category, employing the at least one hardware processor to transmit an indicator of a location of an agent installer to the client device, the agent installer selected from a plurality of agent installers according to the candidate category of devices, wherein the agent installer is configured to install a software agent on the client device, the software agent configured to protect the client device against computer security threats.

9. The method of claim 6 further comprising:

in response to determining whether the client device belongs to the candidate category, when the client device belongs to the candidate category, employing the at least one hardware processor to identify a computer security vulnerability of the client device according to the candidate category.

10. The method of claim 6, wherein the client device is configured to assign network addresses to other client devices connected to the local network, the method further comprising:

in response to determining whether the client device belongs to the candidate category, when the client device belongs to the candidate category, employing the at least one hardware processor to formulate a set of instructions according to the candidate category, the set of instructions configured, when executed by the client device, to render the client system unable to assign network addresses to the other client systems; and in response to formulating the set of instructions, employing the at least one hardware processor to transmit the set of instructions to the client device.

11. A non-transitory computer-readable medium storing instructions which, when executed by at least a hardware processor of a device detection appliance, cause the device detection appliance to:

in response to receiving a set of data from a client device connected to the device detection appliance by a local network, select a candidate category from a plurality of pre-determined device categories, the candidate category characterized by a selected hardware device type co-occurring with a selected operating system;

determine a first score according to a first subset of the set of data, the first score indicative of a first degree to which the client device is representative of the candidate category;

determine a second score according to a second subset of the set of data, the second score indicative of a second degree to which the client device is representative of the candidate category;

combine the first and second scores to produce an aggregate score computed according to $\sigma \cdot w$, wherein $\sigma$ denotes the first score and w denotes a numerical weight determined according to the candidate category; and in response to producing the aggregate score, determine whether the client device belongs to the candidate category according to the aggregate score.

12. The device detection appliance of claim 1, wherein the hardware processor is further configured to:

in response to receiving the set of data, select another candidate category from the plurality of pre-determined device categories, the other candidate category characterized by the selected hardware device type co-occurring with another operating system;

determine a third score indicative of a third degree to which the client device is representative of the other candidate category; and in response, determine whether the client device belongs to the other candidate category according to the aggregate score and the third score.

13. The method of claim 6, further comprising employing the at least one hardware processor to:

in response to receiving the set of data, select another candidate category from the plurality of pre-determined device categories, the other candidate category characterized by the selected hardware device type co-occurring with another operating system;

determine a third score indicative of a third degree to which the client device is representative of the other candidate category; and in response, determine whether the client device belongs to the other candidate category according to the aggregate score and the third score.

14. The device detection appliance of claim 1, wherein the selected hardware device type is selected from a group consisting of a personal computer, a mobile telephone, a tablet computer, a printer, a router, a media player, a television set, a home appliance, and a wearable computer.

15. The device detection appliance of claim 1, wherein the weight is determined according to the selected hardware device type.

16. The device detection appliance of claim 1, wherein the candidate category is further characterized by a selected manufacturer co-occurring with the selected hardware device type and the selected operating system, and wherein the weight is determined according to the selected manufacturer.

17. The device detection appliance of claim 16, wherein the weight is determined according to a count of distinct device models produced by the selected manufacturer.

18. The method of claim 6, wherein the selected hardware device type is selected from a group consisting of a personal computer, a mobile telephone, a tablet computer, a printer, a router, a media player, a television set, a home appliance, and a wearable computer.

19. The method of claim 6, wherein the weight is determined according to the selected device type.

20. The method of claim 6, wherein the candidate category is further characterized by a selected manufacturer co-occurring with the selected hardware device type and the selected operating system, and wherein the weight is determined according to the selected manufacturer.

21. The method of claim 20, wherein the weight is determined according to a count of distinct device models produced by the selected manufacturer.

22. The device detection appliance of claim 1, wherein the aggregate score is determined according to a weighted sum of the first and second scores, wherein both weights multiplying the first and second scores, respectively, are determined according to the candidate category.

23. The method of claim 6, wherein wherein the aggregate score is determined according to a weighted sum of the first and second scores, wherein both weights multiplying the first and second scores, respectively, are determined according to the candidate category.

* * * * *